United States Patent
Costello

(10) Patent No.: US 9,530,278 B2
(45) Date of Patent: *Dec. 27, 2016

(54) INTERACTIVE FINANCIAL TRANSACTIONS

(71) Applicant: Bally Gaming, Inc., Las Vegas, NV (US)

(72) Inventor: Andrew Costello, Las Vegas, NV (US)

(73) Assignee: Bally Gaming, Inc., Las Vegas, NV (US)

(*) Notice: Subject to any disclaimer, the term of this patent is extended or adjusted under 35 U.S.C. 154(b) by 0 days.

This patent is subject to a terminal disclaimer.

(21) Appl. No.: 14/918,325

(22) Filed: Oct. 20, 2015

(65) Prior Publication Data

US 2016/0104350 A1  Apr. 14, 2016

Related U.S. Application Data

(63) Continuation of application No. 13/860,991, filed on Apr. 11, 2013, now Pat. No. 9,165,428.

(Continued)

(51) Int. Cl.
- *G07F 17/32* (2006.01)
- *G06Q 40/00* (2012.01)
- *G06Q 40/02* (2012.01)

(52) U.S. Cl.
CPC .......... *G07F 17/3244* (2013.01); *G06Q 40/00* (2013.01); *G06Q 40/02* (2013.01); *G07F 17/3288* (2013.01)

(58) Field of Classification Search
USPC ........................................................ 463/25
See application file for complete search history.

(56) References Cited

U.S. PATENT DOCUMENTS

| 4,339,798 A | 7/1982 | Hedges et al. |
| 4,802,218 A | 1/1989 | Wright et al. |

(Continued)

FOREIGN PATENT DOCUMENTS

| CA | 2 529 076 A1 | 6/2006 |
| EP | 0790848 B1 | 8/1997 |

(Continued)

OTHER PUBLICATIONS

Bally Technologies, Inc., iVIEW, http://ballytech.com/systems/product.cfm?id=9, download date Nov. 6, 2007, 2 pages.

(Continued)

*Primary Examiner* — Pierre E Elisca
(74) *Attorney, Agent, or Firm* — Seed IP Law Group LLP

(57) ABSTRACT

An interactive financial transactions systems and methods are disclosed for providing gaming activity using funds located at a financial institution. Prior to initiating gaming activity, the player indicates the amount of funds the player would like to wager in a session. The financial institution is contacted to block the player funds from being used for another purpose while the player is placing wagers on the interactive gaming system. As the player completes wagers, the results of wagering activities may be passed to the financial institution. When the player completes the gaming session, the financial institution is instructed to release the blocked funds. In one embodiment, the interactive gaming system contacts an intermediary business which performs the account blocking and financial transactions with the financial institution.

20 Claims, 7 Drawing Sheets

Related U.S. Application Data

(60) Provisional application No. 61/624,352, filed on Apr. 15, 2012, provisional application No. 61/639,980, filed on Apr. 29, 2012.

(56) References Cited

U.S. PATENT DOCUMENTS

| | | |
|---|---|---|
| 4,814,589 A | 3/1989 | Storch et al. |
| 5,179,517 A | 1/1993 | Sarbin et al. |
| 5,265,874 A | 11/1993 | Dickinson et al. |
| 5,283,422 A | 2/1994 | Storch et al. |
| 5,321,241 A | 6/1994 | Craine |
| 5,324,035 A | 6/1994 | Morris et al. |
| 5,413,353 A | 5/1995 | Demarest et al. |
| 5,470,079 A | 11/1995 | LeStrange et al. |
| 5,493,613 A | 2/1996 | Denno et al. |
| 5,505,461 A | 4/1996 | Bell et al. |
| 5,559,312 A | 9/1996 | Lucero |
| 5,603,502 A | 2/1997 | Nagagawa |
| 5,613,912 A | 3/1997 | Slater |
| 5,655,961 A | 8/1997 | Acres et al. |
| 5,707,286 A | 1/1998 | Carlson |
| 5,741,183 A | 4/1998 | Acres et al. |
| 5,759,103 A | 6/1998 | Freels et al. |
| 5,770,533 A | 6/1998 | Franchi |
| RE35,864 E | 7/1998 | Weingardt |
| 5,800,268 A | 9/1998 | Molnick |
| 5,813,912 A | 9/1998 | Shultz |
| 5,816,918 A | 10/1998 | Kelly et al. |
| 5,823,534 A | 10/1998 | Banyai |
| 5,823,879 A | 10/1998 | Goldberg et al. |
| 5,830,067 A | 11/1998 | Graves et al. |
| 5,830,069 A | 11/1998 | Soltesz et al. |
| 5,851,149 A | 12/1998 | Xidos et al. |
| 5,902,983 A | 5/1999 | Crevelt et al. |
| 5,919,091 A | 7/1999 | Bell et al. |
| 5,999,808 A | 12/1999 | LaDue |
| 6,048,269 A | 4/2000 | Burns et al. |
| 6,083,105 A | 7/2000 | Ronin et al. |
| 6,113,493 A | 9/2000 | Walker et al. |
| 6,142,872 A | 11/2000 | Walker et al. |
| 6,142,876 A | 11/2000 | Cumbers |
| 6,190,256 B1 | 2/2001 | Walker et al. |
| 6,210,274 B1 | 4/2001 | Carlson |
| 6,227,972 B1 | 5/2001 | Walker et al. |
| 6,234,898 B1 | 5/2001 | Belamant et al. |
| 6,244,958 B1 | 6/2001 | Acres |
| 6,272,223 B1 | 8/2001 | Carlson |
| 6,279,910 B1 | 8/2001 | de Keller |
| 6,282,522 B1 | 8/2001 | Davis et al. |
| 6,287,202 B1 | 9/2001 | Pascal et al. |
| 6,325,375 B1 | 12/2001 | Potter et al. |
| 6,336,859 B2 | 1/2002 | Jones et al. |
| 6,347,738 B1 | 2/2002 | Crevelt et al. |
| 6,361,437 B1 | 3/2002 | Walker et al. |
| 6,383,076 B1 | 5/2002 | Tiedeken |
| 6,394,907 B1 | 5/2002 | Rowe |
| 6,409,602 B1 | 6/2002 | Wiltshire et al. |
| 6,460,848 B1 | 10/2002 | Soltys et al. |
| 6,464,584 B2 | 10/2002 | Oliver |
| 6,468,155 B1 | 10/2002 | Zucker et al. |
| 6,505,772 B1 | 1/2003 | Mollett et al. |
| 6,508,709 B1 | 1/2003 | Karmarkar |
| 6,508,710 B1 | 1/2003 | Paravia et al. |
| 6,517,435 B2 | 2/2003 | Soltys et al. |
| 6,517,436 B2 | 2/2003 | Soltys et al. |
| 6,520,857 B2 | 2/2003 | Soltys et al. |
| 6,527,271 B2 | 3/2003 | Soltys et al. |
| 6,527,638 B1 | 3/2003 | Walker et al. |
| 6,530,836 B2 | 3/2003 | Soltys et al. |
| 6,530,837 B2 | 3/2003 | Soltys et al. |
| 6,533,276 B2 | 3/2003 | Soltys et al. |
| 6,533,658 B1 | 3/2003 | Walker |
| 6,533,662 B2 | 3/2003 | Soltys et al. |
| 6,547,131 B1 | 4/2003 | Foodman et al. |
| 6,575,829 B2 | 6/2003 | Coleman et al. |
| 6,575,834 B1 | 6/2003 | Lindo |
| 6,579,179 B2 | 6/2003 | Poole et al. |
| 6,579,180 B2 | 6/2003 | Soltys et al. |
| 6,579,181 B2 | 6/2003 | Soltys et al. |
| 6,585,598 B2 | 7/2003 | Nguyen et al. |
| 6,595,857 B2 | 7/2003 | Soltys et al. |
| 6,607,441 B1 | 8/2003 | Acres |
| 6,612,928 B1 | 9/2003 | Bradford et al. |
| 6,629,591 B1 | 10/2003 | Griswold et al. |
| 6,663,490 B2 | 12/2003 | Soltys et al. |
| 6,676,522 B2 | 1/2004 | Rowe et al. |
| 6,679,775 B1 | 1/2004 | Luciano et al. |
| 6,688,979 B2 | 2/2004 | Soltys et al. |
| 6,702,291 B2 | 3/2004 | Grebler et al. |
| 6,702,672 B1 | 3/2004 | Angell et al. |
| 6,712,696 B2 | 3/2004 | Soltys et al. |
| 6,712,702 B2 | 3/2004 | Goldberg et al. |
| 6,739,975 B2 | 5/2004 | Nguyen et al. |
| 6,746,330 B2 | 6/2004 | Cannon |
| 6,749,510 B2 | 6/2004 | Giobbi |
| 6,752,312 B1 | 6/2004 | Chamberlain et al. |
| 6,755,741 B1 | 6/2004 | Rafaeli |
| 6,758,751 B2 | 7/2004 | Soltys et al. |
| 6,800,029 B2 | 10/2004 | Rowe et al. |
| 6,811,488 B2 | 11/2004 | Paravia et al. |
| 6,817,948 B2 | 11/2004 | Pascal et al. |
| 6,837,789 B2 | 1/2005 | Garahi et al. |
| 6,866,586 B2 | 3/2005 | Oberberger et al. |
| 6,899,628 B2 | 5/2005 | Leen et al. |
| 6,905,411 B2 | 6/2005 | Nguyen et al. |
| 6,969,319 B2 | 11/2005 | Rowe et al. |
| 6,971,956 B2 | 12/2005 | Rowe et al. |
| 7,029,009 B2 | 4/2006 | Grauzer et al. |
| 7,035,626 B1 | 4/2006 | Luciano, Jr. |
| 7,056,215 B1 | 6/2006 | Olive |
| 7,063,617 B2 | 6/2006 | Brosnan et al. |
| 7,086,947 B2 | 8/2006 | Walker et al. |
| 7,099,035 B2 | 8/2006 | Brooks et al. |
| 7,108,603 B2 | 9/2006 | Olive |
| 7,128,652 B1 | 10/2006 | Lavoie et al. |
| 7,140,964 B2 | 11/2006 | Walker |
| 7,147,558 B2 | 12/2006 | Giobbi |
| 7,186,181 B2 | 3/2007 | Rowe |
| 7,189,161 B1 | 3/2007 | Wiltshire et al. |
| 7,203,841 B2 | 4/2007 | Jackson et al. |
| 7,213,812 B2 | 5/2007 | Schubert et al. |
| 7,246,799 B2 | 7/2007 | Snow |
| 7,297,062 B2 | 11/2007 | Gatto et al. |
| 7,303,473 B2 | 12/2007 | Rowe |
| 7,303,475 B2 | 12/2007 | Britt et al. |
| 7,311,605 B2 | 12/2007 | Moser |
| 7,407,438 B2 | 8/2008 | Schubert et al. |
| 7,410,422 B2 | 8/2008 | Fine |
| 7,419,428 B2 | 9/2008 | Rowe |
| 7,422,522 B2 | 9/2008 | Fujimoto et al. |
| 7,427,233 B2 | 9/2008 | Walker et al. |
| 7,438,295 B2 | 10/2008 | Aida |
| 7,510,474 B2 | 3/2009 | Carter, Sr. |
| 7,510,478 B2 | 3/2009 | Benbrahim et al. |
| 7,515,718 B2 | 4/2009 | Nguyen et al. |
| 7,516,959 B2 | 4/2009 | Huard et al. |
| 7,534,169 B2 | 5/2009 | Amaitis et al. |
| 7,537,456 B2 | 5/2009 | Snow |
| 7,566,274 B2 | 7/2009 | Johnson et al. |
| 7,575,234 B2 | 8/2009 | Soltys et al. |
| 7,611,404 B1 | 11/2009 | Hilf et al. |
| 7,637,810 B2 | 12/2009 | Amaitis et al. |
| 7,644,861 B2 | 1/2010 | Alderucci et al. |
| 7,648,414 B2 | 1/2010 | McNutt et al. |
| 7,666,095 B2 | 2/2010 | Van Luchene |
| 7,684,874 B2 | 3/2010 | Schlottmann et al. |
| 7,685,516 B2 | 3/2010 | Fischer |
| 7,690,995 B2 | 4/2010 | Frankulin et al. |
| 7,722,453 B2 | 5/2010 | Lark et al. |
| 7,744,452 B2 | 6/2010 | Cimring et al. |
| 7,749,078 B2 | 7/2010 | Vlazny et al. |
| 7,753,779 B2 | 7/2010 | Shayesteh |
| 7,753,789 B2 | 7/2010 | Walker et al. |

(56) References Cited

U.S. PATENT DOCUMENTS

| | | |
|---|---|---|
| 7,753,790 B2 | 7/2010 | Nguyen et al. |
| 7,780,526 B2 | 8/2010 | Nguyen et al. |
| 7,780,529 B2 | 8/2010 | Rowe et al. |
| 7,785,193 B2 | 8/2010 | Paulsen et al. |
| 7,794,319 B2 | 9/2010 | Luciano, Jr. et al. |
| 7,819,742 B2 | 10/2010 | Chamberlain et al. |
| 7,824,255 B2 | 11/2010 | Lutnick et al. |
| 7,824,267 B2 | 11/2010 | Cannon et al. |
| 7,828,649 B2 | 11/2010 | Cuddy et al. |
| 7,846,018 B2 | 12/2010 | Baerlocher |
| 7,850,528 B2 | 12/2010 | Wells |
| 7,857,702 B2 | 12/2010 | Hilbert |
| 7,867,081 B2 | 1/2011 | Schneider et al. |
| 7,867,091 B2 | 1/2011 | Moshal |
| 7,871,323 B2 | 1/2011 | Walker et al. |
| 7,901,294 B2 | 3/2011 | Walker et al. |
| 7,905,770 B2 | 3/2011 | Snow |
| 7,909,689 B2 | 3/2011 | Lardie |
| 7,931,533 B2 | 4/2011 | LeMay et al. |
| 7,946,911 B2 | 5/2011 | Vang et al. |
| 7,988,554 B2 | 8/2011 | LeMay et al. |
| 8,062,121 B2 | 11/2011 | Crivelli |
| 8,062,134 B2 | 11/2011 | Kelly et al. |
| 8,092,289 B2 | 1/2012 | Mai |
| 8,092,307 B2 | 1/2012 | Kelly |
| 8,092,309 B2 | 1/2012 | Bickley |
| 8,147,316 B2 | 4/2012 | Arezina et al. |
| 8,172,661 B1 | 5/2012 | Hein |
| 8,197,344 B2 | 6/2012 | Rathsack et al. |
| 8,241,111 B2 | 8/2012 | Manfredi et al. |
| 8,272,945 B2 | 9/2012 | Kelly et al. |
| 8,285,740 B2 | 10/2012 | Graham et al. |
| 8,303,414 B2 | 11/2012 | Joshi |
| 8,308,554 B2 | 11/2012 | Rowe et al. |
| 8,974,305 B2 | 3/2015 | Costello et al. |
| 9,120,007 B2 | 9/2015 | Costello et al. |
| 9,165,428 B2 | 10/2015 | Costello |
| 2002/0049909 A1 | 4/2002 | Jackson et al. |
| 2002/0111213 A1 | 8/2002 | McEntee et al. |
| 2002/0113371 A1 | 8/2002 | Snow |
| 2002/0115487 A1 | 8/2002 | Wells |
| 2002/0115490 A1 | 8/2002 | Burnet et al. |
| 2002/0142844 A1 | 10/2002 | Kerr |
| 2002/0147047 A1 | 10/2002 | Letovsky et al. |
| 2002/0151363 A1 | 10/2002 | Letovsky et al. |
| 2003/0004871 A1 | 1/2003 | Rowe |
| 2003/0027625 A1 | 2/2003 | Rowe |
| 2003/0042679 A1 | 3/2003 | Snow |
| 2003/0078789 A1 | 4/2003 | Oren |
| 2003/0090064 A1 | 5/2003 | Hoyt et al. |
| 2003/0092486 A1 | 5/2003 | Cannon |
| 2003/0104865 A1 | 6/2003 | Itkis et al. |
| 2003/0232651 A1 | 12/2003 | Huard et al. |
| 2004/0023712 A1 | 2/2004 | Oliver |
| 2004/0029635 A1 | 2/2004 | Giobbi |
| 2004/0087375 A1 | 5/2004 | Gelinotte |
| 2004/0127291 A1 | 7/2004 | George et al. |
| 2004/0132529 A1 | 7/2004 | Mkrtchyan et al. |
| 2004/0133485 A1 | 7/2004 | Schoonmaker et al. |
| 2004/0142744 A1 | 7/2004 | Atkinson et al. |
| 2004/0180722 A1 | 9/2004 | Giobbi |
| 2004/0204231 A1 | 10/2004 | Martin et al. |
| 2004/0235563 A1* | 11/2004 | Blackburn .............. G07F 17/32 463/29 |
| 2004/0248645 A1* | 12/2004 | Blackburn .............. G07F 17/32 463/25 |
| 2005/0032564 A1 | 2/2005 | Sines |
| 2005/0032577 A1* | 2/2005 | Blackburn ............ G07F 17/323 463/42 |
| 2005/0043094 A1 | 2/2005 | Nguyen et al. |
| 2005/0054438 A1 | 3/2005 | Rothschild et al. |
| 2005/0070358 A1 | 3/2005 | Angell et al. |
| 2005/0143166 A1 | 6/2005 | Walker |
| 2005/0164762 A1 | 7/2005 | Smith et al. |
| 2005/0176507 A1 | 8/2005 | Ephrati et al. |
| 2005/0192092 A1 | 9/2005 | Breckner et al. |
| 2005/0266919 A1 | 12/2005 | Rowe et al. |
| 2006/0003828 A1 | 1/2006 | Abecassis |
| 2006/0009282 A1 | 1/2006 | George et al. |
| 2006/0019745 A1 | 1/2006 | Benbrahim |
| 2006/0035707 A1 | 2/2006 | Nguyen et al. |
| 2006/0040745 A1 | 2/2006 | Wells et al. |
| 2006/0046849 A1 | 3/2006 | Kovacs |
| 2006/0052169 A1 | 3/2006 | Britt et al. |
| 2006/0068899 A1 | 3/2006 | White et al. |
| 2006/0121970 A1 | 6/2006 | Khal |
| 2006/0142086 A1* | 6/2006 | Blackburn .............. G07F 17/32 463/42 |
| 2006/0183541 A1 | 8/2006 | Okada et al. |
| 2006/0189381 A1 | 8/2006 | Daniel et al. |
| 2006/0205508 A1 | 9/2006 | Green |
| 2006/0247013 A1 | 11/2006 | Walker et al. |
| 2006/0284376 A1 | 12/2006 | Snow |
| 2007/0015583 A1 | 1/2007 | Tran |
| 2007/0026935 A1 | 2/2007 | Wolf et al. |
| 2007/0054725 A1 | 3/2007 | Morrow et al. |
| 2007/0055753 A1 | 3/2007 | Robb |
| 2007/0060259 A1 | 3/2007 | Pececnik |
| 2007/0060307 A1 | 3/2007 | Mathis et al. |
| 2007/0060310 A1 | 3/2007 | Juds et al. |
| 2007/0072677 A1 | 3/2007 | Lavoie et al. |
| 2007/0093298 A1 | 4/2007 | Brunet |
| 2007/0111775 A1 | 5/2007 | Yoseloff |
| 2007/0111786 A1 | 5/2007 | Snow |
| 2007/0117608 A1 | 5/2007 | Roper et al. |
| 2007/0167235 A1 | 7/2007 | Naicker |
| 2007/0173322 A1* | 7/2007 | Swamy .................. G07F 17/32 463/42 |
| 2007/0184905 A1 | 8/2007 | Gatto et al. |
| 2007/0197294 A1 | 8/2007 | Gong |
| 2007/0197298 A1 | 8/2007 | Rowe |
| 2007/0198418 A1 | 8/2007 | MacDonald et al. |
| 2007/0202941 A1 | 8/2007 | Miltenberger et al. |
| 2007/0208816 A1 | 9/2007 | Baldwin et al. |
| 2007/0213116 A1 | 9/2007 | Crawford et al. |
| 2007/0214058 A1 | 9/2007 | Rouhi et al. |
| 2007/0225061 A1 | 9/2007 | Naobayashi |
| 2007/0235521 A1 | 10/2007 | Mateen et al. |
| 2007/0243925 A1 | 10/2007 | LeMay et al. |
| 2007/0243927 A1 | 10/2007 | Soltys |
| 2007/0243935 A1 | 10/2007 | Huizinga |
| 2007/0259709 A1 | 11/2007 | Kelly et al. |
| 2008/0004108 A1 | 1/2008 | Klinkhammer |
| 2008/0009344 A1 | 1/2008 | Graham et al. |
| 2008/0032763 A1 | 2/2008 | Giobbi |
| 2008/0038035 A1 | 2/2008 | Shuldman et al. |
| 2008/0039192 A1 | 2/2008 | Laut |
| 2008/0039208 A1 | 2/2008 | Abrink et al. |
| 2008/0073840 A1 | 3/2008 | Comeau |
| 2008/0076572 A1 | 3/2008 | Nguyen et al. |
| 2008/0090651 A1 | 4/2008 | Baerlocher |
| 2008/0096656 A1 | 4/2008 | LeMay et al. |
| 2008/0096659 A1 | 4/2008 | Kreloff et al. |
| 2008/0113773 A1 | 5/2008 | Johnson et al. |
| 2008/0113781 A1 | 5/2008 | Soltys et al. |
| 2008/0119284 A1 | 5/2008 | Luciano, Jr. et al. |
| 2008/0136102 A1 | 6/2008 | Hoover |
| 2008/0146337 A1 | 6/2008 | Halonen et al. |
| 2008/0176627 A1 | 7/2008 | Lardie |
| 2008/0248875 A1 | 10/2008 | Beatty |
| 2008/0252011 A1 | 10/2008 | Bickley et al. |
| 2008/0261701 A1 | 10/2008 | Lewin et al. |
| 2008/0300046 A1 | 12/2008 | Gagner et al. |
| 2008/0311971 A1 | 12/2008 | Dean |
| 2009/0005176 A1 | 1/2009 | Morrow et al. |
| 2009/0100409 A1 | 4/2009 | Toneguzzo |
| 2009/0115133 A1 | 5/2009 | Kelly et al. |
| 2009/0118001 A1 | 5/2009 | Kelly et al. |
| 2009/0118005 A1 | 5/2009 | Kelly et al. |
| 2009/0121434 A1 | 5/2009 | Baerlocher et al. |
| 2009/0137312 A1 | 5/2009 | Walker et al. |
| 2009/0156310 A1 | 6/2009 | Fargo |
| 2009/0163279 A1 | 6/2009 | Hermansen et al. |
| 2009/0275374 A1 | 11/2009 | Nelson et al. |

(56) References Cited

U.S. PATENT DOCUMENTS

| | | |
|---|---|---|
| 2009/0275393 A1 | 11/2009 | Kisenwether et al. |
| 2009/0275395 A1 | 11/2009 | McAllister et al. |
| 2009/0275398 A1 | 11/2009 | Nelson |
| 2009/0275399 A1 | 11/2009 | Kelly et al. |
| 2009/0275402 A1 | 11/2009 | Backover et al. |
| 2009/0275411 A1 | 11/2009 | Kisenwether et al. |
| 2009/0276715 A1 | 11/2009 | Arbogast et al. |
| 2009/0298577 A1 | 12/2009 | Gagner et al. |
| 2009/0307069 A1 | 12/2009 | Meyerhofer |
| 2009/0315264 A1 | 12/2009 | Snow et al. |
| 2009/0325708 A9 | 12/2009 | Kerr |
| 2010/0016050 A1 | 1/2010 | Snow et al. |
| 2010/0016068 A1 | 1/2010 | White et al. |
| 2010/0048304 A1 | 2/2010 | Boesen |
| 2010/0069155 A1 | 3/2010 | Schwartz et al. |
| 2010/0125851 A1 | 5/2010 | Singh et al. |
| 2010/0178987 A1 | 7/2010 | Pacey |
| 2010/0197410 A1 | 8/2010 | Leen et al. |
| 2010/0234110 A1 | 9/2010 | Clarkson |
| 2010/0240440 A1 | 9/2010 | Szrek et al. |
| 2010/0255899 A1 | 10/2010 | Paulsen |
| 2011/0009188 A1 | 1/2011 | Adiraju et al. |
| 2011/0105208 A1 | 5/2011 | Bickley |
| 2011/0130190 A1 | 6/2011 | Hamman et al. |
| 2011/0159952 A1 | 6/2011 | Kerr |
| 2011/0159953 A1 | 6/2011 | Kerr |
| 2011/0165936 A1 | 7/2011 | Kerr |
| 2011/0172008 A1 | 7/2011 | Alderucci |
| 2011/0183748 A1 | 7/2011 | Wilson et al. |
| 2011/0230268 A1 | 9/2011 | Williams |
| 2011/0269529 A1 | 11/2011 | Baerlocher |
| 2011/0275430 A1 | 11/2011 | Walker et al. |
| 2011/0287829 A1 | 11/2011 | Clarkson et al. |
| 2012/0015724 A1 | 1/2012 | Ocko et al. |
| 2012/0015725 A1 | 1/2012 | Ocko et al. |
| 2012/0015743 A1 | 1/2012 | Lam et al. |
| 2012/0015747 A1 | 1/2012 | Ocko et al. |
| 2012/0021835 A1 | 1/2012 | Keller et al. |
| 2012/0034977 A1 | 2/2012 | Kammler |
| 2012/0115616 A1 | 5/2012 | Phillips et al. |
| 2012/0295691 A1 | 11/2012 | Walker |
| 2013/0053117 A1 | 2/2013 | Snow |
| 2013/0184060 A1 | 7/2013 | Costello et al. |
| 2013/0296024 A1 | 11/2013 | Castle |
| 2013/0296025 A1 | 11/2013 | Castle |

FOREIGN PATENT DOCUMENTS

| | | |
|---|---|---|
| EP | 1463008 A2 | 9/2004 |
| GB | 2382034 A | 5/2003 |
| WO | 2007/047223 A2 | 4/2007 |
| WO | 2011/109454 A1 | 9/2011 |

OTHER PUBLICATIONS

Bally TMS, "MP21—Automated Table Tracking/Features," 2 pages, Nov. 2005.

Burke, A., "Tracking the Tables," reprinted from *International Gaming & Wagering Business*, Aug. 2003, 4 pages.

Costello et al., "Play for Fun Network Gaming System and Method," Office Action mailed Jan. 29, 2013, for U.S. Appl. No. 13/624,743, 7 pages.

Costello, "Interactive Financial Transactions," Office Action mailed Dec. 12, 2014, for U.S. Appl. No. 13/860,991, 5 pages.

Costello, "Interactive Financial Transactions," Amendment filed Mar. 11, 2015, for U.S. Appl. No. 13/860,991, 15 pages.

Costello, "Interactive Financial Transactions," Notice of Allowance mailed Jun. 17, 2015, for U.S. Appl. No. 13/860,991, 9 pages.

*Gambling Magazine*, "Gaming Company Takes RFID to the Casino," Dec. 27, 2004, accessed Aug. 25, 2006, URL =http:/www.gamblingmagazine.com/managearticle.asp?C=290&A=13186, 4 pages.

Gros, R., "All You Ever Wanted to Know About Table Games," reprinted from *Global Gaming Business*, Aug. 1, 2003, 2 pages.

International Search Report and Written Opinion for co-pending application PCT/US13/22153, dated Apr. 8, 2013.

International Search Report and Written Opinion for co-pending application PCT/US13/21959, dated May 10, 2013.

MagTek, "Port Powered Swipe Reader," Technical Reference Manual, Manual Part No. 99875094 Rev 12, Jun. 2003, 20 pages.

Mikohn, "Mikohn Tablelink—The Industry's Premier Table Tracking Solution Delivers Improvements Straight to the Bottom Line," 2 pages, before Jan. 1, 2004.

Shuffle Master, Inc., "Shuffle Master Announces New Products; Intelligent Table System to Be Debuted at G2E," Sep. 10, 2003, 2 pages.

Terdiman, D., "Who's Holding the Aces Now?", reprinted from *Wired News*, Aug. 18, 2003, 2 pages.

Winkler, C., "Product Spotlight: MindPlay," reprinted from *Gaming and Leisure Technology*, Fall 2003, 2 pages.

\* cited by examiner

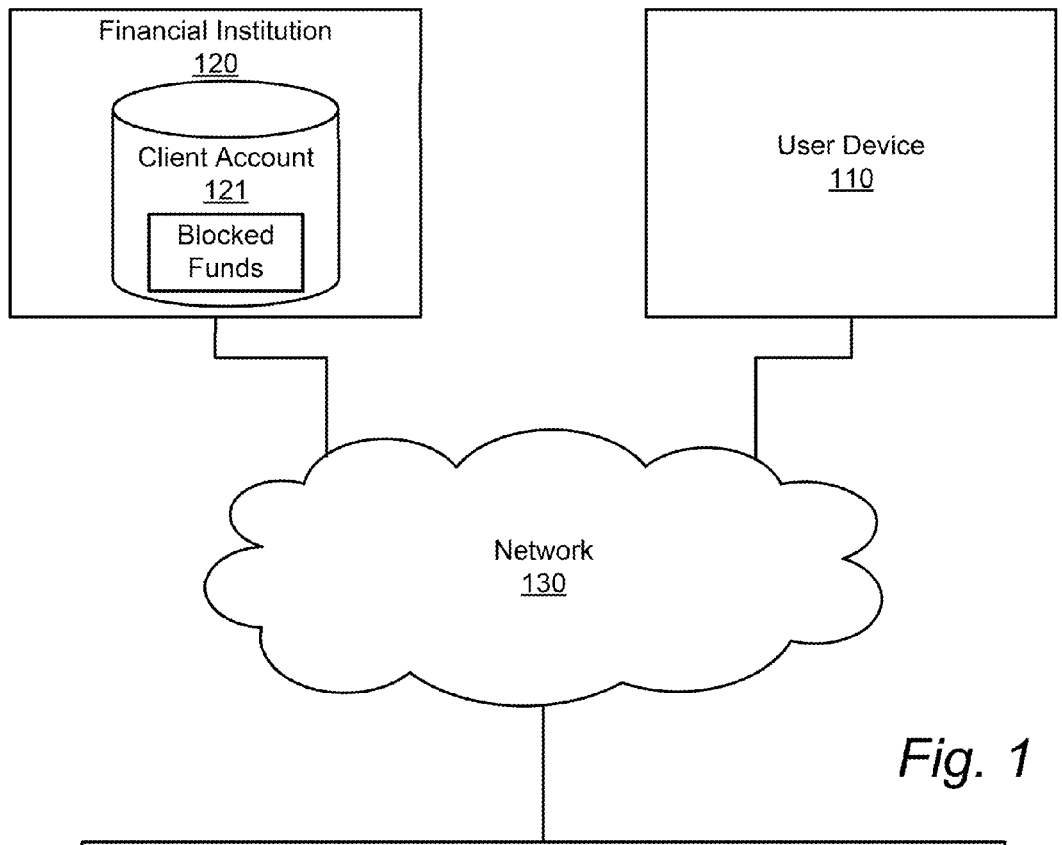
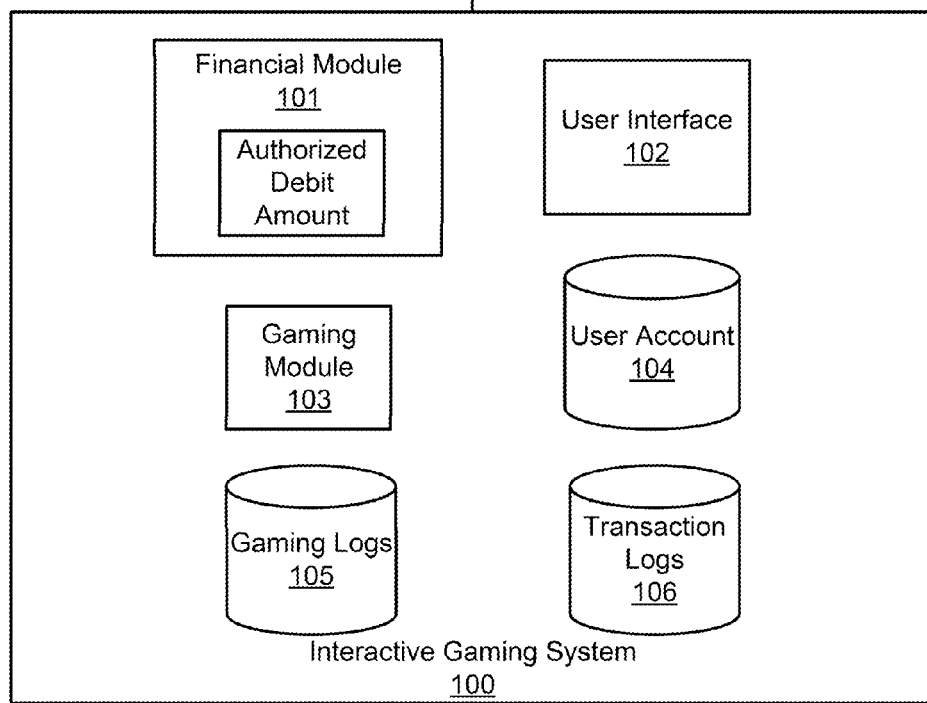
Fig. 1

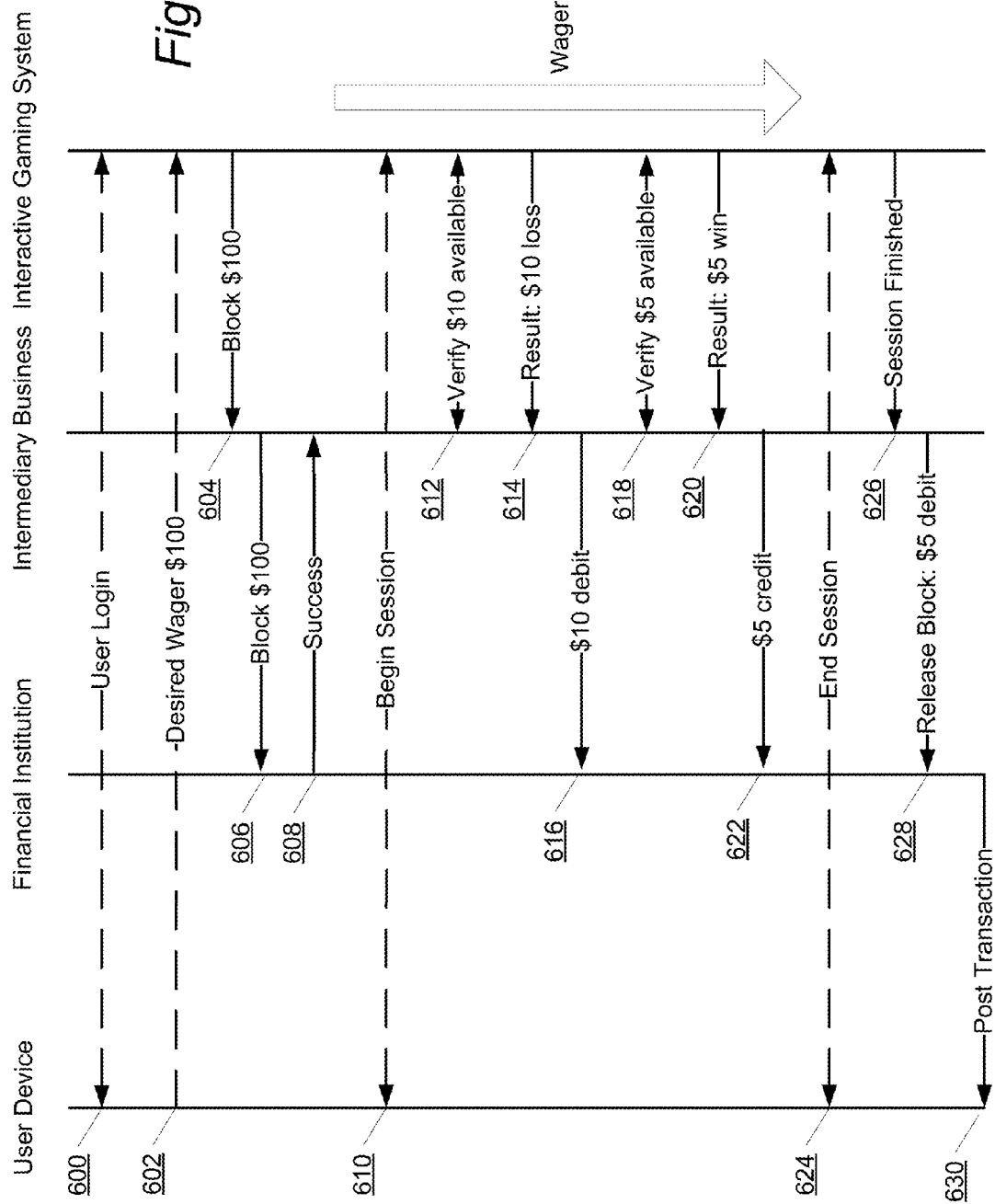

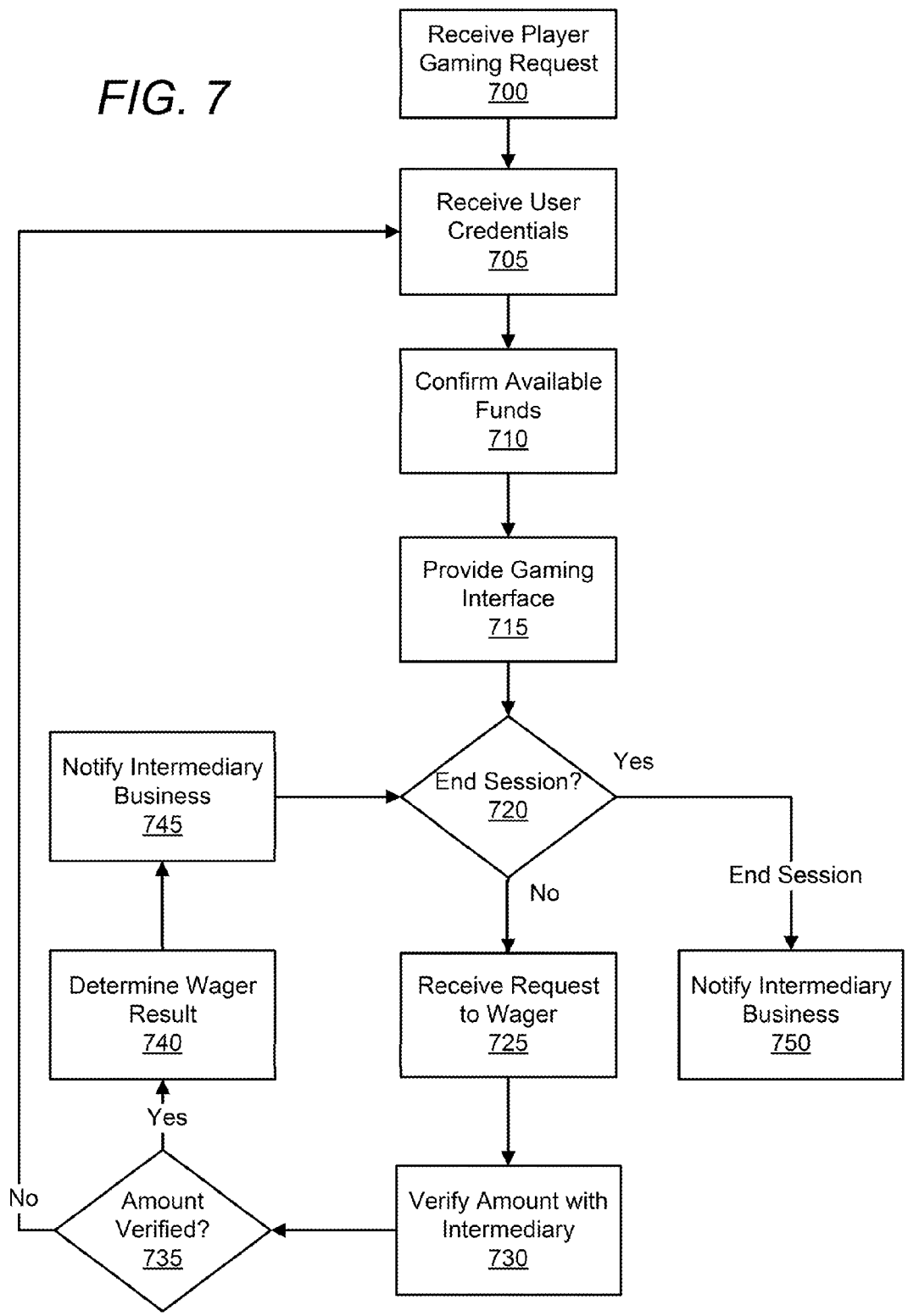

INTERACTIVE FINANCIAL TRANSACTIONS

CROSS-REFERENCE TO RELATED APPLICATIONS

This application is a continuation of U.S. patent application Ser. No. 13/860,991 filed Apr. 11, 2013, now U.S. Pat. No. 9,165,428, which claims the benefit of U.S. Provisional Application No. 61/624,352, filed Apr. 15, 2012, and 61/639,980, filed Apr. 29, 2012, all of which are incorporated herein by reference.

FIELD OF INVENTION

This invention relates generally to networked interactive gaming systems.

BACKGROUND

Interactive gaming systems allow users to win or lose money by placing wagers according to the rules of a game. Players wager money against the operator of the interactive gaming system or against other players in a variety of games. Financial security for players is a crucial aspect of an interactive gaming system.

In typical systems, the interactive gaming operator maintains a player's account for each player with a balance of money available to the player to wager. A player transfers money to the interactive gaming system to fund a player's account. These transfers are typically executed using credit card, bank wire, an automated clearing house, or other money transfer system. Completing the transfer places funds in the player's account on the interactive gaming system. As the player wins and loses wagers, funds are credited and debited from the player's account on the interactive gaming system. A player can play several sessions and leave player funds in the player's account on the interactive gaming system. When a player desires to withdraw the player funds, the player instructs the interactive gaming system to transfer funds to the player's chosen financial institution.

This financial arrangement has drawbacks. There is typically a delay in transferring payments from the user's financial institution to the interactive gaming system, and a similar delay in transferring payments from the gaming system to the user's financial institution. In addition, the interactive gaming system acts as a financial fiduciary for the user, which places additional regulatory burdens on the interactive gaming system beyond the regulations relating to operating wagering games and requires further security measures to protect player funds. Moreover, players may be hesitant to place significant funds with a non-financial entity operating an interactive gaming system.

SUMMARY

An interactive gaming system is provided in one embodiment which processes player credits and debits by blocking user's funds at a financial institution. A player wishing to wager at the interactive gaming system indicates an amount the player wishes to wager. The interactive gaming system contacts the player's financial institution or a third party having at least some access to a player's account, and requests a block on the amount of funds the player wishes to wager or an amount that incorporates anticipated gameplay results over a game session. As the player places bets and engages in gaming activity, the results of the gaming activity are transmitted to the financial institution or the third party. When the gaming activity is complete, the interactive gaming system notifies the financial institution or third party to net the player's results and unblock any remaining funds.

In one embodiment, the interactive gaming system contacts an intermediary business system as the third party to manage the player's financial account. The interactive gaming system communicates with the intermediary business system rather than the financial institution. The intermediary business system communicates with the financial institution or another institution that has the system of record for that player's account to manage the player funds. In this embodiment, the interactive gaming system may not retain a player balance or the amount of remaining blocked funds, and instead requests authorizations and balance information from the intermediary business system. The intermediary business system receives wagering results from the interactive gaming system and manages blocks and account settlement with the financial institution or the institution that has the system of record.

This system allows a user to place wagers with the interactive gaming system without transferring funds to the interactive gaming system. As a result, the player does not have a delay in transferring money to or from the interactive gaming system. In addition, the player funds remain at a financial institution that is responsible for fiduciary duties over the player's accounts. Since the funds are blocked at the financial institution or the institution that has the system of record while a player places wagers, the interactive gaming system is also protected from certain risks of player non-payment.

BRIEF DESCRIPTION OF THE DRAWINGS

FIG. 1 is a system overview of an interactive gaming system according to an embodiment.

FIG. 6 is a timing diagram illustrating wagering with a financial block and an intermediary business system according to an embodiment.

FIG. 7 illustrates a flowchart for a gaming module interacting with an intermediary business system according to an embodiment.

Figure 2:
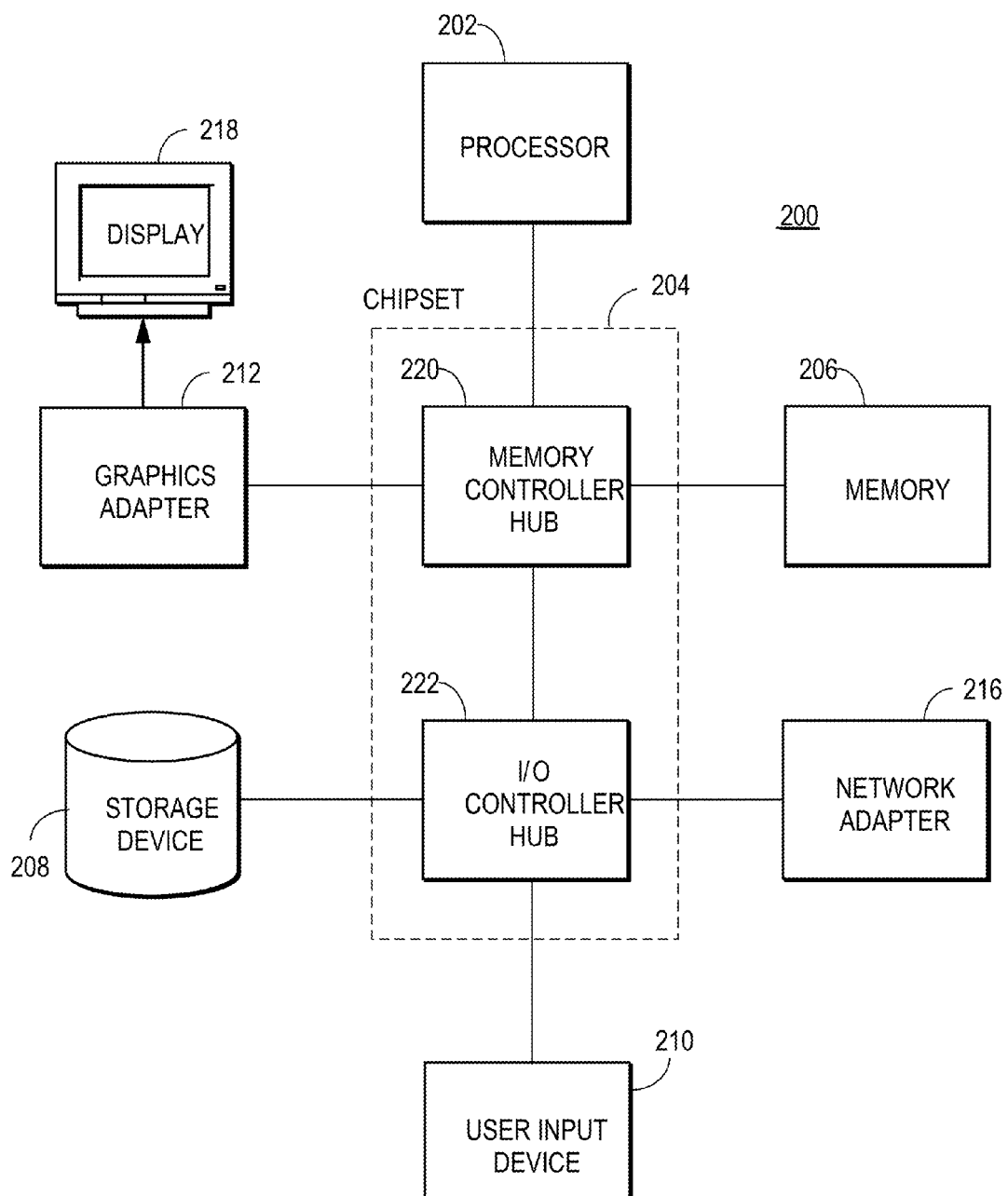
FIG. 2 is a high-level block diagram of a computer for acting as an interactive gaming system according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The terms "gaming," "gambling," or the like, refer to activities, games, sessions, rounds, hands, rolls, operations, and other events related to wagering games such as web games, casino games, card games, dice games, and other games including elements of chance for which wagers may be placed by a player. Unless indicated otherwise, an individual gameplay is the end result of a single hand or sequence of game steps that includes an amount wagered and results in a determination of an amount won or lost. Within an individual gameplay, the total amount wagered may be the result of more than one individual wagers, according to the rules of the game. A game session is a series of gameplays. In addition, the word "wager," "bet," "bid" or the like, refer to any type of wagers, bets or gaming ventures that are placed on games whose results are based upon one or more random events.

Embodiments of the present disclosure include wagering games in which a single player is present at a virtual table competing against the house and wagering games in which multiple players are present at the virtual table competing against the house, each other, or a combination thereof. Therefore, while this disclosure provides examples which describe a player or a user, the singular use of such terms is used for convenience and also describes systems used by multiple players.

Overview

FIG. 1 is a system overview of an interactive gaming system 100 according to an embodiment. The interactive gaming system 100 communicates with a user device 110 and a financial institution 120 through a network 130. The interactive gaming system 100 communicates with the user device 110 to provide wagering games for a player operating the user device 110. Though a single user device 110 and financial institution 120 are shown here for convenience, a plurality of each may be used in practice.

The interactive gaming system 100 provides gaming services to user device 110 and interfaces with the financial institution 120 to handle financial accounts. The interactive gaming system 100 may be operated in an authorized gaming establishment with a gaming floor, e.g. a casino, or may be operated at any other location suitable for providing online gaming. The interactive gaming system 100 includes a user interface 102 to communicate with the user device 110. The user interface 102 provides information to the user device 110 for presentation to the user of the user device ("a player") and provides player interactions to other modules in the interactive gaming system 100. The player provides financial information to the user interface 102 that is provided to the financial module 101 and gaming responses that are provided to gaming module 103.

The user interface 102 communicates with the user device 110 to enable access to the interactive gaming system 100. The user interface 102 allows a user to create and access a user account 104 and interact with gaming module 103. The user interface 102 allows users to initiate new games, join existing games, and interface with games being played by the user.

The user interface 102 communicates with the user device 110 according to the method of connection used by the user device 110. For example, the user device 110 may connect to the interactive gaming system using a web browser capable of interpreting HTML and/or a scripting language. The user interface 102 serves appropriate HTML and/or scripting language to provide an interface for the user device 110 to communicate with the interactive gaming system 100. The user device 110 may also execute an application or comprise a specialized system such as a kiosk, game console, set-top box, smart phone, touch panel, or other device. The user interface 102 provides control information for each modality of user device which may be connected to the interactive gaming system 100. The user interface 102 also provides encrypted and secure communications with the user device 110 to ensure security of gaming data.

The user interface 102 may also provide a client application or code for execution on the user device 110 for accessing the interactive gaming system 100. The client provided by the interactive gaming system 100 for execution on the user device 110 can comprise a variety of implementations compatible with the user device 110 and method of communication with the interactive gaming system 100. In one embodiment, the user device 110 connects to the interactive gaming system 100 using a web browser and the client executes within a browser window or frame of the web browser. In another embodiment, the client is a stand-alone executable on the user device 110.

For example, the client may comprise a relatively small amount of script (e.g., JavaScript) also referred to as a "script driver," including scripting language that controls an interface of the user device 110. The script driver may include simple function calls requesting information from the interactive gaming system 100. In other words, the script driver stored in the client may merely include calls to functions that are externally defined by, and executed by, the interactive gaming system 100. As a result, the client may be characterized as a "thin client." As that term is used herein, the client may be little more than a script player. The client may simply send requests to the interactive gaming system 100 rather than performing logic itself. The client receives player inputs and the player inputs are passed to interactive gaming system 100 for processing and executing the wagering game. In other embodiments, the client comprises an executable rather than a script. As a result, the bulk of the processing of the gameplay is performed in the interactive gaming system 100. The client may receive intermediate data and final game outcome information from the interactive gaming system 100 for displaying on the user device 110 after such is determined by the gaming module 103.

In another embodiment, the client implements further logic and game control methodology beyond the thin client described above. For example, the client may parse and define player interactions prior to passing the player interactions to the interactive gaming system 100. Likewise, when the client receives a gaming interaction from the interactive gaming system 100, the client may be configured to determine how to modify the display as a result of the gaming interaction. The client may also allow the player to change a perspective or otherwise interact with elements of the display which do not change aspects of the game.

The financial module 101 determines funds available for each player and determines what the player has available to wager. The financial module 101 communicates with financial institution 120 to identify a player's account at the financial institution and request a block to the user's funds at the financial institution 120. The blocked amount is maintained for the player in the financial module 101 as an authorized debit amount. The authorized debit amount is the maximum amount the player is allowed to lose in the session without blocking additional funds. The authorized debit amount and player's winnings less player's losses may be used for wagers by the player.

The "block" requested by the financial module 101 to the financial institution 120 is a request for the financial institution 120 to set aside or reserve an amount of money equal to the amount blocked, so that these funds are not available for other transactions by the player while the funds remain blocked. In other words, the block requires the financial institution 120 to guarantee the blocked amount to be available to settle any debts incurred by the player to the interactive gaming system 100. The blocked funds are not transferred to accounts belonging to the interactive gaming system 100, and represent the maximum amount of authorized debit from the player in the session. In this embodiment the player's actual transactions in the interactive gaming system 100 are transmitted to the financial institution 120 and are netted to determine a final transaction amount to or from the player. As transactions are communicated to the financial institution 120, the transactions are stored in transaction logs 106 maintained by the interactive gaming system.

The block described in this disclosure is distinct from a "pre-authorization" used with credit or debit cards. A pre-authorization is a practice of authorizing electronic transactions and holding the authorized amount as unavailable to user until the merchant clears the transaction or the hold expires. These pre-authorizations may be cleared as a batch at the end of the day or may be cleared without any specified period for clearance. The actual charged amount is not necessarily tied to the authorization amount. For example, a merchant may pre-authorize a $10 purchase and actually charge a $5 purchase that is below the pre-authorization amount or a $25 purchase that is above the pre-authorization amount. In addition, the pre-authorizations are linked to a single transaction event with the pre-authorizing merchant. The pre-authorization event is a separate event from the actual charge that may be eventually submitted by a merchant. Both may, and typically do, exist at the same time. Thus, a pre-authorization will typically have an expiration of a few days (e.g., 48 hours, 72 hours, etc.). The merchant that asked for the pre-authorization may then submit a charge while the pre-authorization is still active (the two are not tied together; they are separate events). Many merchants do not intentionally cancel a pre-authorization and simply rely on the fact that requested pre-authorizations will be expired by the financial institution. Thus, a single merchant can have on record simultaneously, for a single buyer and a single transaction, multiple outstanding pre-authorizations and submitted charges. The buyer is left with the problem that their account or credit card, having both pre-authorizations and submitted charges for the same concurrently outstanding transaction, may or will appear to be out of funds when actually there are plenty of funds in the account after the outstanding pre-authorizations expire.

The block used in this disclosure is resolved when the player completes a gaming session, the block is a maximum amount of debit from a player's account, and the block may be resolved with several wagering results comprising debits and credits. In particular, the unblocking event and net wagering results are coordinated to a single transaction (or summary of transactions over a game session) such that a player does not have a block outstanding at the same time as any deposits or withdrawals as a result of gameplay are made. Any block is released as part of the overall transaction of finalizing a gameplay, or game session, withdrawal or deposit. As a result, after completion of a game transaction, a player has use of their net resulting funds.

As the player interacts with gaming module 103 to place wagers, the results of the wagers are communicated to the financial module 101. The financial module 101 relays the amount won or lost to the financial institution 120 to indicate the wagering results by the player. When the player is finished with a session, the financial module 101 notifies the financial institution 120. The financial module 101 nets the result of the wagering wins and losses and coordinates a final transaction amount with the financial institution 120. The financial module 101 also indicates to the financial institution 120 that the block can be released as the remaining funds are no longer available for wagers. As discussed above, the block is released as part of the transaction to finalize the session of gameplay concurrent with the final transaction amount.

Each player is associated with a user account 104. The user account 104 maintains information about the player and the player's gameplay. The user account 104 includes information about the player's name, login credentials, handle (or screen name), gaming activity, and other information about the player. The user account 104 may also store information about the user's financial information to enable the user to access gaming without re-entering financial information each time.

For convenience in this disclosure, gaming activity provided by the interactive gaming system 100 is provided by gaming module 103. Gaming module 103 provides the backend support for wagering games offered by the interactive gaming system 100. The gaming module 103 can comprise further modules for supporting various wagering games and coordinates gameplay across players. In some embodiments, gaming module 103 is separated into several components and servers and may be disposed on a separate system in communication with interactive gaming system 100. The games offered by gaming module 103 may include, without limitation, various types of wagering games such as card games, dice games, big wheel games, roulette, scratch off games, and any other wagering game. Such games typically include a randomized element in determining wagering outcomes.

The gaming module 103 communicates with financial module 101 to determine the amount of funds available for wagering by the player, and provides the results of wagers to the financial module 101. The gaming module 103 may implement various security measures to ensure that gameplay is fair and complies with game rules. Such security measures may include firewalls and backend servers to prevent direct access by players or other systems to secured resources. The backend servers may provide, for example, information to be hidden from particular players and randomization information used to randomize gameplay. The interactions of players with gaming module 103 are recorded in gaming logs 105 to track game results and provide auditing services for games.

The interactive gaming system 100 may be configured using a distributed server architecture. For example, the gaming module 103 may include a plurality of servers (e.g., game rules server, deck server, game routing server, account server, asset server, etc.) that are logically separated to perform different functions for the wagering game. Additional features may be supported by the interactive gaming system 100, such as hacking and cheating detection, data storage and archival, metrics generation, messages generation, output formatting for different end user devices, as well as other features and operations. For example, the interactive gaming system 100 may include additional features and configurations as described in U.S. patent application Ser. No. 13/353,194, filed Jan. 18, 2012 and U.S. patent application Ser. No. 13/609,031, filed Sep. 10, 2012, both entitled "Network Gaming Architecture, Gaming Systems, and Related Methods," the entire disclosures of which are incorporated herein by this reference.

The user device 110 presents a gaming interface to the player and communicates the user interaction to the interactive gaming system 100. The user device 110 may be any electronic system capable of displaying gaming information, receiving user input and communicating the user input to the interactive gaming system. As such, the user device 110 can be a desktop computer, a laptop, tablet computer, set-top box, mobile device, kiosk, terminal, or other computing device. The user device 110 may operate a specialized application for connecting to the interactive gaming system 100. Alternatively, the user device 110 may connect to the interactive gaming system 100 using a generalized application capable of interpreting instructions from the interactive gaming system 100, such as a web browser.

Financial institution 120 is an entity which enables player financial transaction activity. Financial institution 120 may comprise a bank, credit union, credit processor, credit card issuer, or other such institution. Financial institution 120 includes a client account 121 representing assets or credit associated with the player on user device 110. In typical cases the financial institution is a bank which holds cash for a player in the client account 121, though any financial institution which is drawn on by the player for cash may be used. The financial institution 120 receives requests and financial transaction information from the financial module 101 of the interactive gaming system 100. Responsive to a request to block funds, the financial institution 120 determines whether the client account 121 has sufficient funds and blocks the funds from use by another transaction. The blocked funds may also be subject to instructions from the player, such as limiting the amount of funds which may be blocked, or disallowing the use of blocked funds for an interactive gaming system.

The financial institution 120 in this embodiment receives information from the financial module 101 indicating the results of wagers made by the player in the interactive gaming system 100. The financial institution 120 records wager results as the player's session at the interactive gaming system 100 continues. When the financial module 101 indicates the session is finished, the financial institution 120 reconciles the transactions in the client account 121 to create a consolidated entry for the session and releases any remaining blocked funds. The released funds are now available for general use in the client account 121. The credit or debit owed for the client account 121 is settled with an account associated with the operator of the interactive gaming system 100. The operator's account may also be with financial institution 120, or a transaction may be initiated with an account external to financial institution 120. The settlement of client account 121 is performed when the session finishes. In some instances, the settlement of the account (and accompanying release of the block) cannot be performed immediately. In these instances, the settlement is performed responsive to the end of the player's session and is performed as soon as reasonably practicable. The actual amount of time is determined by the ability of the financial institution 120 to complete settlement. Thus, while the system may incur a delay after the game session is ended before the transaction is settled, the settlement does not delay for a predetermined or specified period (e.g., 24 hours or to the end of a business day) before settling the account.

While described here as a single block on the account, multiple blocks may be established on a particular account. The multiple blocks may be established by several play sessions authorized to play on an account. Each of the multiple blocks is managed individually and can provide individual settled transactions.

If the financial module 101 fails to notify the financial institution 120 within a threshold period of time that a player's session has ended, the financial institution 120 can use the wager results to construct a transaction for the interactive gaming system 100 reflecting the wager results. In this way, a player funds are not needlessly blocked while ensuring the interactive gaming system operator pays any player credits and is paid for any player debits.

In an embodiment, the wager results are not transmitted to the financial institution 120 during the gaming session, and the wager results may be transmitted when the account is settled and the block is released.

The network 130 enables communications between the user device 110 and the financial institution 120. In one embodiment, the network 130 uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 may include the Internet and/or may also include links to other networks.

The network 130 may also provide differing access methods for user device 110 and financial institution 120. User device 110 may communicate directly with interactive gaming system 100 over an encrypted communications channel. The financial institution 120 may be communicated with using higher security methods used for financial transactions, which may include further firewalls and authentication methods.

Computer System

FIG. 2 is a high-level block diagram of a computer 200 for acting as an interactive gaming system 100 according to one embodiment. The computer 200 is typically a server-class computing device capable of managing thousands or tens of thousands of connections and coordinating wagering and financial block activity for many players simultaneously. Illustrated are at least one processor 202 coupled to a chipset 204. Also coupled to the chipset 204 are a memory 206, a storage device 208, a user input device 210, a graphics adapter 212, and a network adapter 216. A display 218 is coupled to the graphics adapter 212. In one embodiment, the functionality of the chipset 204 is provided by a memory controller hub 220 and an input/output (I/O) controller hub 222. In another embodiment, the memory 206 is coupled directly to the processor 202 instead of the chipset 204.

The storage device 208 is any non-transitory computer-readable storage medium, such as a hard drive, compact disk read-only memory (CD-ROM), DVD, or a solid-state memory device. The memory 206 holds instructions and data used by the processor 202. The user input device 210 is used to input data into the computer system. The graphics adapter 212 displays text, images and other information on the display 218. The network adapter 216 couples the computer system 200 to a local or wide area network.

As is known in the art, the computer 200 can have different and/or other components than those shown in FIG.

2. In addition, the computer 200 can lack certain illustrated components. In one embodiment, the computer 200, acting as an interactive gaming system 100, lacks a user input device 210, graphics adapter 212, and/or display 218. Moreover, the storage device 208 can be local and/or remote from the computer 200 (such as embodied within a storage area network (SAN)).

The interactive gaming system 100 may comprise several such computers 200. The interactive gaming system 100 may include load balancers, firewalls, and various other components for assisting the interactive gaming system 100 to provide services to a variety of user devices 110.

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Financial Block

Figure 3:
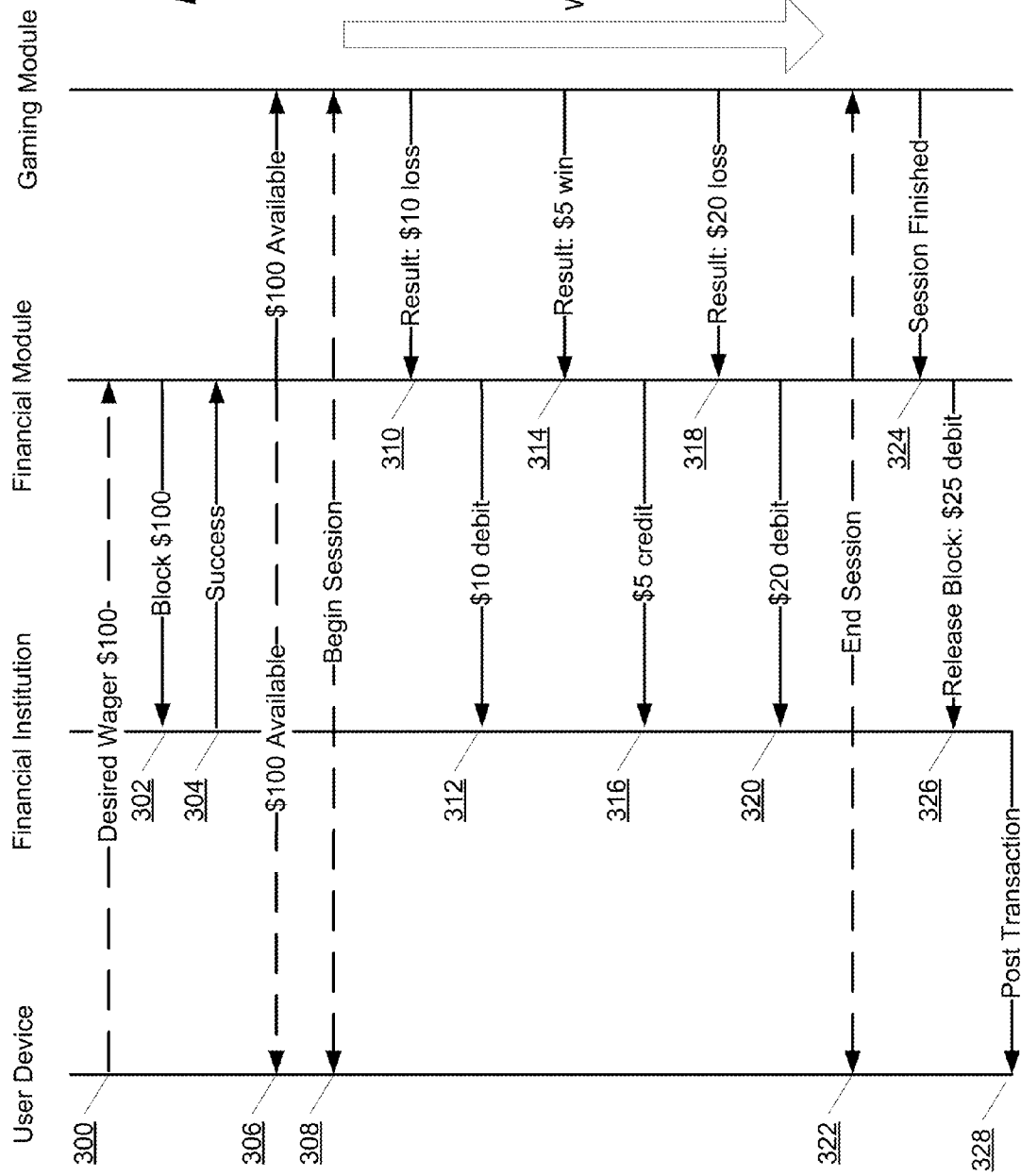
FIG. 3 is a timing diagram illustrating wagering with a financial block according to one embodiment.

FIG. 3 is a timing diagram illustrating wagering with a financial block according to one embodiment. Illustrated in this diagram are the interactions between a user device, a financial institution, and financial and gaming modules implemented in an interactive gaming system. Initially, a player contacts the interactive gaming system 100 and logs in to the system. The player provides the interactive gaming system 100 with the player's financial institution information or the player's financial information is loaded from a stored user profile. Note that this information may be otherwise available, such as from a player's card ID coupled with data in a local or remote database associated with the card ID. Next, the player indicates a desired maximum session wagering amount (e.g., $100) to the financial module 101 (step 300). The financial module 101 contacts the financial institution 120 and requests a block of $100 to allow the player to engage in wagering (step 302). The financial institution 120 checks the player's account and determines whether it is able to block the requested amount of funds. In this case, the funds are successfully blocked, and the financial institution 120 notifies the financial module 101 of the successful blocking (step 304). The financial module 101 indicates to the player and to the gaming module 103 that $100 have successfully been blocked and are available to wager (step 306).

The player through the user device 110 now begins a game session with the gaming module 103 (step 308). In this embodiment, as the player wins and losses in a series of individual gameplay, results are reported to the financial module 101. The wins and losses are generated by the user's play during the game session. In the first result in this example, the player loses a $10 wager and the loss is communicated to the financial module 101 (step 310). The financial module 101 reports the loss to the financial institution 120 (step 312). The financial institution 120 in this embodiment does not complete any transaction, and continues to maintain the full blocked amount of $100. At the financial module 101, the $10 loss reduces the remaining authorized debit amount of the user by $10 to $90. As the next wagering result, the gaming module 103 reports a $5 win to the financial module 101 (step 314). The financial module 101 also reports this $5 credit to the financial institution 120 (step 316) and adjusts the authorized debit amount to reflect the $5 credit. Another $20 loss is reported by the gaming module 103 (step 318) and is reported to the financial institution 120 (step 320).

In another embodiment, the reported wager results (steps 312, 316, and 320) are not reported to the financial institution 120 during the game session. In this embodiment the wager results are reported to the financial institution 120 either as a batch of transactions or a net amount after the game session ends.

After these wager results, the player notifies the gaming module 103 that the player is ending the game session (step 322). The player may end the session by various methods, such as logging out of the gaming module 103 or disconnecting from the interactive gaming system 100, for example. The gaming module 103 notifies the financial module 101 that the game session has ended (step 324). The financial module 101 communicates with the financial institution 120 to release the blocked funds and create a debit transaction to the operator of the interactive gaming system for the net $25 loss by the player (step 326). The financial institution 120 releases the blocked funds and posts the $25 debit to the player's account with the financial institution 120. The posted transaction is optionally transmitted to the user device 110 operated by the player (step 328).

Though reflected in this figure as wagering whole dollar amounts and for a few transactions, actual user transactions may be for a significantly wider range of sums and with significantly more transactions. For example, many recreational players may wager small amounts, for example playing a $0.05 ante poker game for a buy-in of $5 or $10. Each hand may yield an individual credit or debit reported to the financial module. Other higher stakes players may wager $5 ante game with a buy in of $5,000. In either case, each hand may create a wagering result for each player involved in the game. In an hour-long game session, it may be common to have between 30 and 100 such hands transpire in the gaming module 103.

In one embodiment, each action by a player within a wagering game which alters the amount of money subject to loss is reported, even though a particular game result is not finalized. For example, each betting round in a multi-betting round game may provide a wagering result as a player adds additional money to a pot. In another example, in a game of casino war, the player may wager additional money to double the player's original bet when the player is dealt the same rank of card as the dealer. The additional wager may be an additional wager result.

In another example, the wager result may be produced as the player commits funds to a wagering game. For example, the gaming module 103 may create a wager result of a $10 loss when a player playing blackjack for $10 a hand initially decides to play a hand. If the player wins the hand, a wager result of a $20 win may be generated (a $10 win and the $10 original bet). This method may be used to prevent savvy players from attempting to drop out of a game prior to completion of the game by timing out or otherwise failing to complete a betting round. For example, if a player sees the initial cards are not favorable to the player, the player may attempt to avoid finishing the game and the high likelihood of an accompanying loss. The generation of such wager results may also be affected by applicable regulations governing the wagering games.

Financial Block Communications

Figure 4:
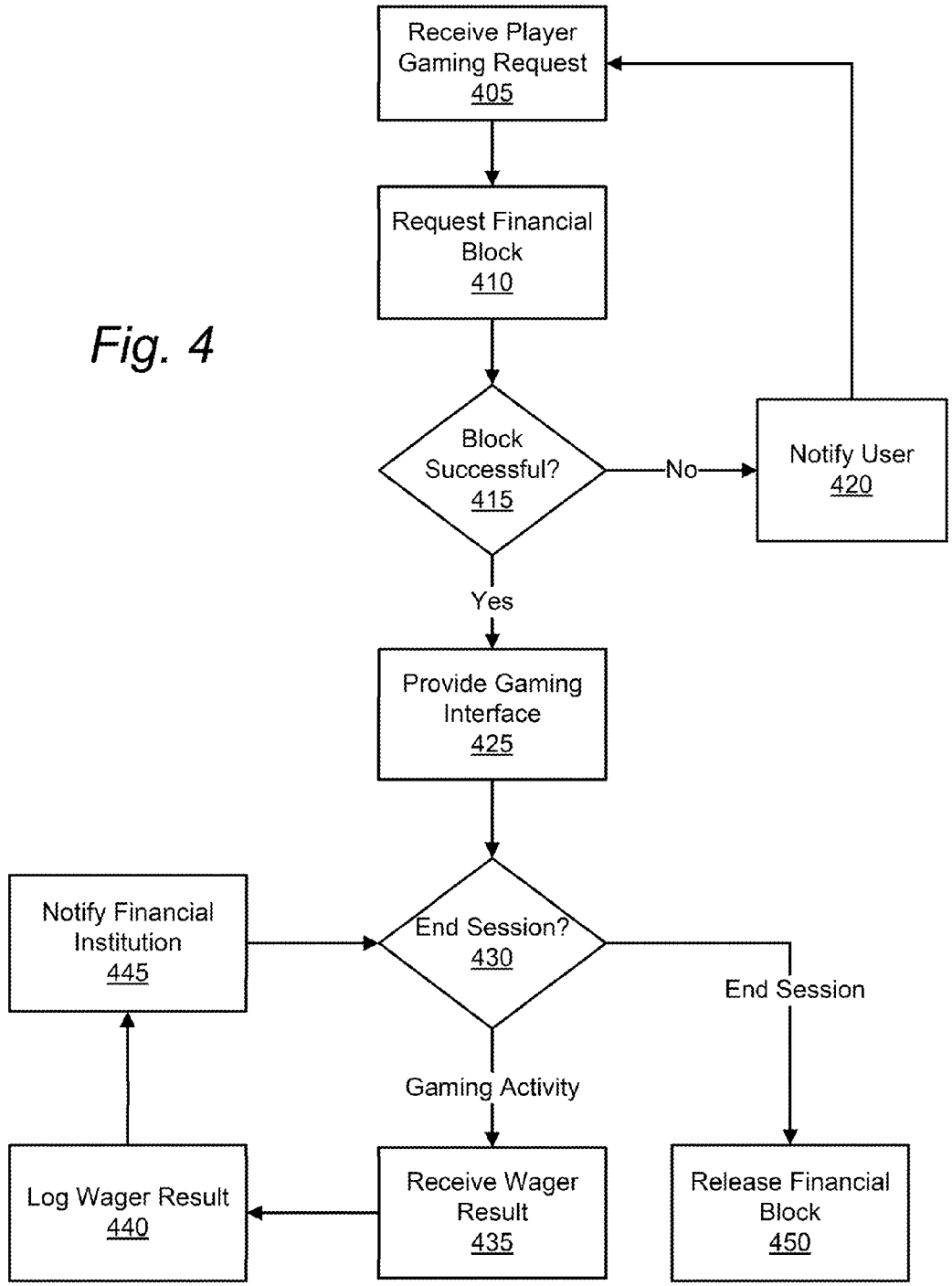
FIG. 4 illustrates a flowchart for a financial module managing funds for an interactive gaming system according to an embodiment.

FIG. 4 illustrates a flowchart for a financial module 101 managing funds for an interactive gaming system according to an embodiment. The financial module 101 receives a request from a player through user device 110 to play with funds located at a financial institution 120 (step 405). Next, the financial module 101 requests a financial block from the financial institution 120 to block the funds at the financial institution 120 (step 410). The financial module 101 determines whether the block was successful (step 415). If the block was not successful, the user is notified (step 420) and the user may provide a new request (step 405).

If the block was successful, a gaming interface is provided to the user via the gaming module 103 and user device 110 to allow the user to begin wagering the blocked money (step 425). The user may decide to end the user's gaming session at any time (step 430). When the user makes a wager, the financial module receives the result of the user's gaming activity (step 435). The user's wager result is logged (step 440) and the financial institution is notified of the activity as described above (step 445). When the user ends the game session, the financial module communicates with the financial institution to release the financial block and settle the player activity for the game session (step 450). In some embodiments, the results of multiple wagers are transmitted to the financial institution 120, but the financial institution 120 does not act upon the blocked funds until the gaming session ends. That is, in this embodiment, the financial institution 120 does not net the winning/losses of the player against the blocked funds until the session ends. The session may end, for example, by a notification from the financial model 101, due to the player logging off the system or shutting down the user device 110, due to the user device 110 losing a network connection, due to player running out of money, due to a timeout period representative of a lapse of time with no activity, etc.

Intermediary Business System

Figure 5:
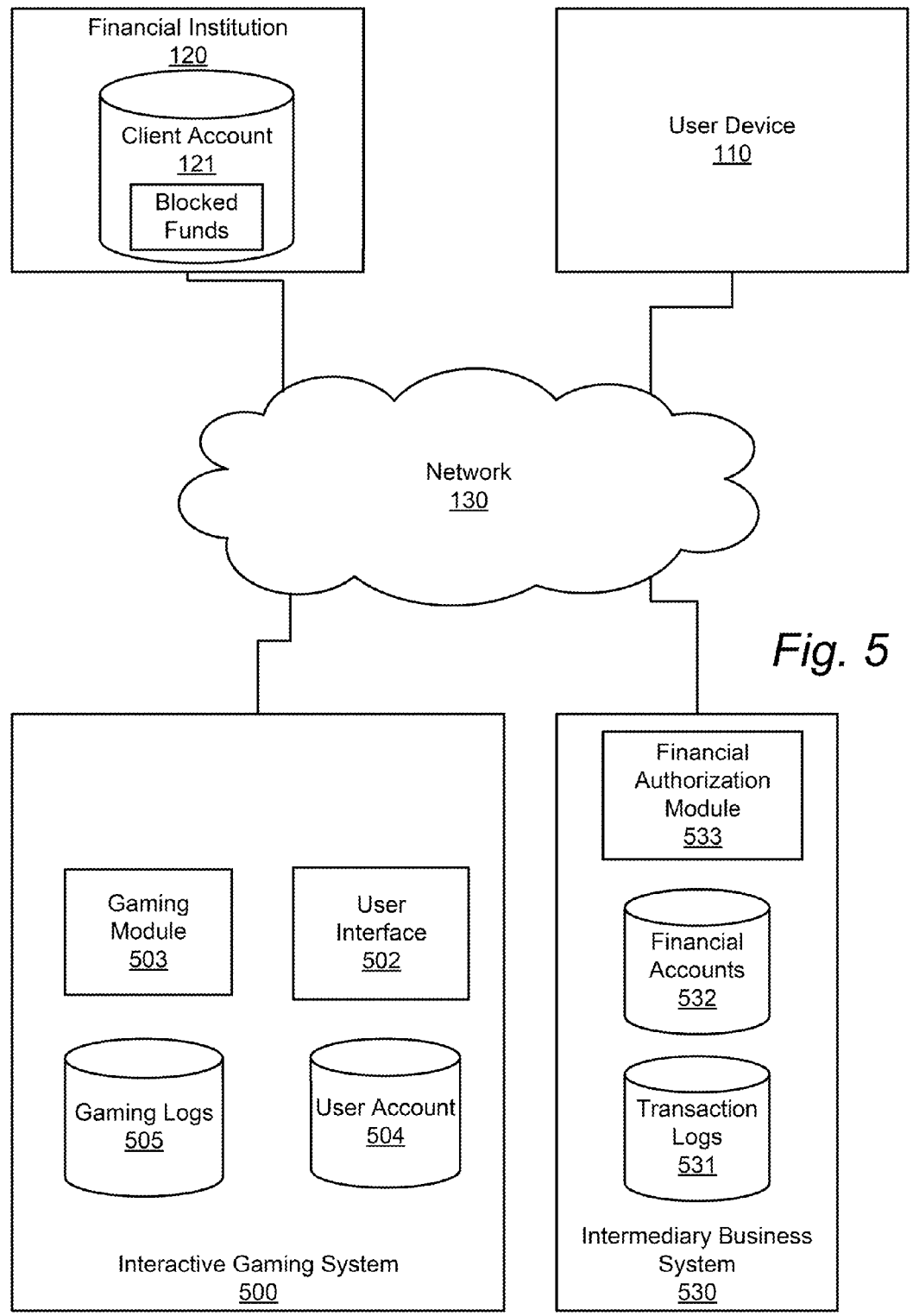
FIG. 5 is a system overview of an interactive gaming system and an intermediary business system according to an embodiment.

FIG. 5 is a system overview of an interactive gaming system 500 and an intermediary business system 530 according to an embodiment. In this embodiment, rather than communicating directly with the financial institution 120, the interactive gaming system 500 communicates with intermediary business system 530 with regard to funds available to a player. The intermediary business system 530 receives information from the interactive gaming system 500 regarding a player and communicates with financial institution 120 to establish a block on funds and manage funds available for the player to wager. The intermediary business system 530 is responsible for managing player's accounts rather than the interactive gaming system 500. Though shown in FIG. 5 as a single intermediary business system 530, a plurality of intermediary business systems 530 may be used which may connect to a variety of financial institutions 120.

The interactive gaming system 500 communicates with an intermediary business system 530, a financial institution 120, and a user device 110 through a network 130. The financial institution 120, user device 110, and network 130 in this embodiment comprise similar components and provide similar functionality to the same components described above and with respect to FIG. 1.

In this embodiment, financial information and financial accounts are managed by the intermediary business system 530. The intermediary business system 530 coordinates blocked funds with the financial institution 120 and maintains a record of the amount of funds available for wagering. While the interactive gaming system 500 in this embodiment may maintain a value displayed to the user representing the amount available for the user to wager, the amount maintained by the intermediary business system 530 is typically controlling.

The interactive gaming system 500 provides gaming services to user device 110 and interfaces with the intermediary business system 530 to handle financial accounts 532. The interactive gaming system 500 includes user accounts 504 and gaming logs 505 which provide similar functionality to user accounts 104 and gaming logs 105 as described above. The gaming module 503 provides gaming functionality to users similar to gaming module 103 as described above. The gaming module 503 communicates with the intermediary business system 530 to verify the player has sufficient funds available to wager. As wagering results are generated by the gaming module 503, the results are reported to the intermediary business system 530.

The interactive gaming system 500 includes a user interface 502 to communicate with the user device 110 for presentation to the player and provides player interactions to the intermediary business system 530 and other components of the interactive gaming system 500. The user interface 502 communicates with the user device 110 as described above with respect to user interface 102.

In addition to communicating with the user device 110, the user interface 502 also coordinates communications with intermediary business system 530. The user interface 502 in one embodiment collects information from the player and passes the information to the intermediary business system 530. To the user, the user interface 502 appears to be associated with the interactive gaming system 500. In this embodiment the user's account details and financial access is provided to the intermediary business system 530. When the user logs into the system via the user interface 502, the user interface 502 prompts the user to identify financial account information. The user interface 502 transmits the user's financial account information to the intermediary business system 530. In this embodiment, the user enters information at the interactive gaming system 500 and is not exposed to the intermediary business system 530. Alternatively, the user interface 502 may act as a pass-through entity for the user to communicate with intermediary business system 530, which identifies itself as an intermediary managing the funds with the financial institution 120. The intermediary business system 530 optionally provides an interface for use within the user interface provided to the user.

In an alternate embodiment, the user interacts directly with the intermediary business system 530 to provide financial account information. In this embodiment, the user interaction with the intermediary business system 530 is used to establish account information and provide financial information to the intermediary business system 530. The user is directed to the intermediary business system 530 through an interface on the user device 110 or through a web page to establish and maintain the account.

The user may communicate with the interactive gaming system 500 or the intermediary business system 530 to establish a block prior to placing a wager at the interactive gaming system 500. The interactive gaming system 500 in one embodiment provides an identifier to the intermediary business system to verify the user's identity and does not have access to financial information the user communicated to the intermediary business system 530. In this embodiment, the interactive gaming system 500 is segregated from financial information which the user provides directly to the intermediary business system 530.

The intermediary business system 530 is an intermediary between the financial institution 120 and the interactive gaming system 500. The intermediary business system 530 is typically operated on a computer similar to the one shown in FIG. 2. The intermediary business system 530 maintains a financial authorization module 533, financial accounts 532, and transaction logs 531. The financial authorization module 533 receives communications from users, either directly or through the interactive gaming system 500. The financial authorization module 533 accesses accounts at financial institution 120 responsive to the received communications and requests a block on funds at the financial institution 120. The financial authorization module 533 also receives requests for wagering amounts from the gaming module 503 and authorizes wagers by determining whether there are sufficient blocked funds for the wager. The financial authorization module 533 receives wagering results from the gaming module 503. The gaming results are stored by the financial authorization module 533 in transaction logs 531 and used to update financial accounts 532.

The financial authorization module 533 contacts the financial institution 120 to establish a block on a client account 121 and communicates with the financial institution 120 to settle accounts after wagering activity has finished. Player wagering activity and block information is maintained in financial accounts 532. As the financial authorization module 533 receives wagering results, the financial authorization module 533 updates financial accounts 532. In one embodiment, the financial authorization module 533 also notifies the financial institution 120 as wagering results are received similar to the updates described with respect to the financial module 101. In another embodiment, the financial authorization module 533 maintains a record of transactions and provides a batch submission of wagering results to the financial institution 120 when the player session is complete.

When the player's session with the interactive gaming system 500 is complete, the financial authorization module 533 coordinates with the financial institution 120 to settle the player's account and unblock player funds in client account 121.

In some financial arrangements, the financial institution 120 is not the system of record for the player's financial account. The system of record is the system responsible for an authoritative record of the balance and transaction information of the account. In many cases, such as shown in FIGS. 1 and 5, the financial institution 120 maintains the system of record for the player's account. For certain accounts at the financial institution 120, the financial institution 120 does not maintain the system of record and instead the system of record is maintained by a record holder, which maintains the authoritative record of an account balance and is external to the financial institution 120. For example, while the player's financial institution 120 is bank A, the record holder for the account may be bank B. In certain cases, the record holder manages an aggregated pool of accounts that includes balances for several accounts owned by customers of the financial institution 120 and may also include balances for additional financial institutions. The aggregated pool of accounts may be maintained by the record holder, or may be maintained by another external system as shown here.

The intermediary business system 530 determines whether the financial institution 120 maintains the system of record for the player's account. The financial institution 120 may provide information to the intermediary business system 530 designating the system of record as being maintained by the record holder responsive to a request for a block on the player's client account. The intermediary business system 530 interacts with whichever system maintains the system of record for the player's account in order to ensure the funds are blocked and settled with the authoritative record of the account. When the record holder maintains authoritative records (the system of record) of the player's account, the intermediary business system 530 communicates with the system of record to establish a block, report wagering results, and settle the player's wagering. Thus, when requesting a block on an account and settling transactions, the intermediary business system 530 communicates with the system managing the authoritative record of the account to ensure the player funds are accurately accounted for.

Intermediary Business Interactions

FIG. 6 is a timing diagram illustrating wagering with a financial block and an intermediary business system 530 according to an embodiment. A user device contacts the interactive gaming system to login to the interactive gaming system (step 600). The user communicates financial information to the interactive gaming system or indicates to the interactive gaming system an account with an intermediary business system. The user requests a wager for the session of $100 to the interactive gaming system (step 602). The interactive gaming system contacts an intermediary business system and requests an authorization of $100 (step 604). The interactive gaming system provides financial institution credentials to the intermediary business system from the user or the intermediary business loads such credentials from a stored account. The intermediary business system contacts the identified financial institution (or applicable system of record) to establish a block for the player funds in the requested amount of $100 (step 606). The financial institution 120 establishes a block on the player funds and notifies the intermediary business system 530 that the block was successful (step 608). The intermediary business system 530 may also indicate to the interactive gaming system 500 that the authorization was successful (not shown).

The player now begins a gaming session with the interactive gaming system 500 (step 610). As the player requests wagers, the interactive gaming system 500 verifies with the intermediary business system 530 that the user has funds available to satisfy the desired wager. In the example in FIG. 6, the user first requests a wager of $10. The interactive gaming system 500 contacts the intermediary business system 530 to verify that $10 is available for a wager (step 612). The amount is verified and the wager result is a $10 loss. The result of the loss is reported to the intermediary business system 530 by the interactive gaming system 500 (step 614). The interactive gaming system 500 may also request an updated balance to display to the user (not shown). In this embodiment, the intermediary business system 530 reports the result of the wager to the financial institution 120 (step 616). In other embodiments, the intermediary business system 530 nets the play results of the batch and reports the net results to the financial institution 120. As described above, the reported amount to the financial institution 120 does not establish a credit or debit to the user's account at the financial institution 120. In another embodiment, the intermediary business system 530 does not report the result of each wager and instead may batch the reporting of wager results to the financial institution 120. The user requests a new $5 wager, and the interactive gaming system 500 again verifies that the requested wager amount is available (step 618). As such, in this embodiment, the interactive gaming system 500 does not rely on an internal account and verifies with the intermediary business system 530 before allowing each player wager. Exemplary, the result of this wager is a win, which the interactive gaming system 500 reports to the intermediary business system 530 (step 620). The intermediary business system 530 reports the result as a credit to the financial institution 120 (step 622).

The player finishes a game session with the interactive gaming system 500 (step 624). When the game session ends, the interactive gaming system 500 notifies the intermediary business system 530 of the game session end (step 626). The intermediary business system 530 nets the player's credits and debits against the block amount and coordinates with the financial institution 120 to settle a final transaction amount and release the block on the player's account (step 628). The financial institution 120 posts the transaction to the player's account and may notify the user device of the posted transaction (step 630). As described above, when the system of record is maintained at record holder, rather than communicate with the financial institution 120 as shown, the intermediary business system 530 communicates with the record holder.

Game Processing with Intermediary

FIG. 7 illustrates a flowchart for a gaming module interacting with an intermediary business system according to an embodiment. The gaming module initially receives a request from a player to initiate gaming (step 700). The gaming module requests and receives user credentials and an amount to block from the user for a financial institution or loads such credentials from a user account (step 705). The gaming module communicates user credentials and the amount to block with the intermediary business system. The intermediary business system communicates with the financial institution to block funds. The gaming module confirms with the intermediary business system that the requested funds are successfully blocked (step 710). Next, the gaming module provides a gaming interface to the user for initiating wagers (step 715). The user may end the session at any time (step 720).

When the player selects a game and a wager amount, the gaming module receives a request to wager an amount from the player (step 725). The gaming module communicates with the intermediary business system to verify the requested wager amount is available for wagering (step 730). The gaming module verifies the amount is available (step 735). If the amount is available, the game proceeds and the gaming module determines a wager result according to the rules of the game (step 740). The gaming module notifies the intermediary business system of the game results (step 745). If the amount is not verified, the user is notified and presented an option to provide user credentials to block additional funds (step 705). The gaming module may also communicate with the intermediary business system to retrieve the amount of funds which remain blocked and provide the amount to the user. When the player ends a game session, the intermediary business system is notified (step 750). The intermediary business system nets the player's account and settles with the financial institution to unblock the player funds.

Through the use of an intermediary business system, the interactive gaming system does not handle player funds or direct a financial institution to manage player funds. The operator of the interactive gaming system is responsible for managing regulations relating to game operation and is not required to manage financial obligations. The intermediary business system operator can manage the financial aspects of a wagering system without being responsible for the regulatory regimes relating to fair and accurate operation of offering a gaming system.

Dedicated Account

In one alternative embodiment, the financial institution 120 allows a single block on the player's account at any given moment. In this embodiment, the financial institution rejects any requests for a block on an account with an existing block. In this way, when a block is granted for a particular interactive gaming system or intermediary business system, no other blocks are allowed on the account. In this embodiment, the financial institution may allow the entire account balance to be available for wagering and placed in the block. Blocking the entire account value may be subject to the user's request. While the account value is blocked, the entire account is not used for other purposes until the block is released by the end of a session and accompanying settlement of any credits and debits.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

I claim:

1. A gaming platform, comprising:
at least one intermediary business server that, in operation:
receives, from a client device of a user via one or more computer networks or from the client device via one or more interactive gaming servers, a request to initiate a wagering session with the client device for play of a wagering game, wherein the request specifies an amount of funds for use in the wagering session;
responsive to the received request, transmits, to a financial institution via the one or more computer networks, a block request to place a block on the specified amount of funds in a financial account associated with the user;
receives, via the one or more computer networks, a notification from the financial institution that the block has been placed on the specified amount of funds in the associated financial account;
responsive to the received notification, provides, to the one or more interactive gaming servers, an indication that the requested wagering session is authorized for the specified amount of funds; and
responsive to an indication from the one or more interactive gaming servers that the requested wagering session is concluded, settles, via one or more electronic communications with the financial institution over the one or more computer networks, a transaction corresponding to the requested wagering session, wherein settling the transaction includes a release of the financial block on the specified amount of funds; and
at least one interactive gaming server of the one or more interactive gaming servers, the at least one interactive gaming server in operation:
responsive to an indication from the at least one intermediary business server that a requested wagering session is authorized for a specified amount of funds, initiates the requested wagering session;
provides, for each of one or more gaming outcomes associated with the requested wagering session, a notification to the at least one intermediary business server regarding the gaming outcome; and
notifies the at least one intermediary business server that the requested wagering session is concluded.

2. The gaming platform of claim 1 wherein in operation the at least one intermediary business server reports each of the one or more gaming outcomes to the financial institution.

3. The gaming platform of claim 1 wherein settling the transaction further includes reconciling, with the financial account associated with the user, a net result associated with the requested wagering session.

4. The gaming platform of claim 1 wherein in operation the at least one intermediary business server further:

receives a second request to initiate a distinct second wagering session;
transmits a second block request to place a second block on an indicated amount of funds; and
responsive to a notification from the financial institution that the second block has not been placed, prevents, via the at least one interactive gaming server, initiation of the requested second wagering session.

5. The intermediary system of claim 4 wherein the notification that the second block has not been placed is based at least in part on a failure to verify that the second financial account contains the indicated amount of funds.

6. An intermediary server for controlling access to at least one interactive gaming server, comprising:
one or more processors; and
at least one memory, the memory including instructions that, upon execution by at least one of the one or more processors, cause the intermediary system to:
receive, from a client device of a user via one or more computer networks or from the client device via the at least one interactive gaming server, a request to initiate a wagering session with the client device for play of a wagering game, wherein the request specifies an amount of funds for use in the wagering session;
responsive to the received request, transmit, to a financial institution via the one or more computer networks, a block request to place a block on the specified amount of funds in a financial account associated with the user;
responsive to a notification from the financial institution that the block has been placed, initiate, via the at least one interactive gaming server over the one or more computer networks, the requested wagering session; and
responsive to a conclusion of the requested wagering session, settle, via one or more electronic communications with the financial institution over the one or more computer networks, a transaction corresponding to the requested wagering session, wherein settling the transaction includes a release of the financial block on the specified amount of funds.

7. The intermediary server of claim 6 wherein the instructions further cause the intermediary server to report, for each of one or more wagering results associated with the requested wagering session and prior to the end of the requested wagering session, the wagering result to the financial institution.

8. The intermediary server of claim 6 wherein settling the transaction further includes reconciling, with the financial account associated with the user, a total amount associated with one or more wagering results associated with the requested wagering session.

9. The intermediary server of claim 6 wherein the intermediary server is part of a gaming platform, and wherein the gaming platform further includes the at least one interactive gaming server.

10. The intermediary server of claim 6 wherein the instructions further cause the intermediary server to:
receive a second request via the at least one interactive gaming server to initiate a distinct second wagering session for play of the wagering game;
transmit a second block request to place a second block on an indicated amount of funds in a second financial account associated with the received second request; and responsive to a notification that the second block has not been placed, prevent, via the at least one interactive gaming server, initiation of the requested second wagering session.

11. The intermediary server of claim 10 wherein the notification that the second block has not been placed is based at least in part on a failure to verify that the second financial account contains the indicated amount of funds.

12. The intermediary server of claim 6 wherein the intermediary server is part of a gaming platform that includes the at least one interactive gaming server.

13. The intermediary server of claim 6, further comprising one or more data structures that store user account data, wherein the stored user account data at least associates the user with the financial institution.

14. The intermediary server of claim 6, wherein the instructions further cause the intermediary server to receive financial institution data from the client device via the at least one interactive gaming server.

15. A computer-implemented method comprising:
receiving, by at least one intermediary business server from a user device of a user via one or more computer networks or by the at least one intermediary business server from at least one interactive gaming server, a request to initiate a wagering session with the user device for play of a wagering game, the request specifying an amount of funds for use in the wagering session;
responsive to the received request, transmitting, by the at least one intermediary business server to a financial institution via the one or more computer networks, a block request to place a block on the specified amount of funds in a financial account associated with the user;
responsive to a notification from the financial institution that the block has been placed, initiating, by the at least one intermediary business server via the at least one interactive gaming server over the one or more computer networks, the requested wagering session; and
responsive to a conclusion of the requested wagering session, settling, by the at least one intermediary business server via one or more electronic communications with the financial institution over the one or more computer networks, a transaction corresponding to a net result of the requested wagering session, wherein settling the transaction includes a release of the financial block on the specified amount of funds.

16. The computer-implemented method of claim 15 wherein initiating the requested wagering session includes providing, by the at least one intermediary business server, an indication to the at least one interactive gaming server that the requested wagering session is authorized.

17. The computer-implemented method of claim 15 further comprising for each of one or more wagering outcomes associated with the requested wagering session and prior to the end of the requested wagering session, reporting, by the at least one intermediary business server, the wagering outcome to the financial institution.

18. The computer-implemented method of claim 15, further comprising:
receiving, by the at least one intermediary business server, a second request via the at least one interactive gaming server to initiate a distinct second wagering session;
transmitting, by the at least one intermediary business server, a second block request to place a second block on an indicated amount of funds in a second financial account associated with the received second request; and
responsive to a notification that the second block has not been placed, preventing, by the at least one intermediary business server via the interactive gaming server, initiation of the requested second wagering session.

19. The computer-implemented method of claim 15, further comprising storing, by the at least one intermediary business server, user account data that associates the user with the financial institution.

20. The computer-implemented method of claim 15, further comprising receiving, by the at least one intermediary business server, information regarding the financial institution from the user device.

* * * * *